United States Patent
Namuduri et al.

(10) Patent No.: US 7,354,056 B2
(45) Date of Patent: Apr. 8, 2008

(54) TRAILER STABILITY CONTROL APPARATUS

(75) Inventors: Chandra Sekhar Namuduri, Troy, MI (US); David S. Rule, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/444,502

(22) Filed: May 23, 2003

(65) Prior Publication Data

US 2004/0232652 A1 Nov. 25, 2004

(51) Int. Cl.
B60D 1/32 (2006.01)

(52) U.S. Cl. .................................... 280/455.1

(58) Field of Classification Search ............... 280/432, 280/455.1; 188/112 A
See application file for complete search history.

(56) References Cited

U.S. PATENT DOCUMENTS

| | | | |
|---|---|---|---|
| 3,722,920 A * | 3/1973 | Reese | 280/455.1 |
| 4,040,507 A * | 8/1977 | Reise | 280/455.1 |
| RE30,550 E * | 3/1981 | Reise | 280/455.1 |
| 4,313,616 A * | 2/1982 | Howard | 280/455.1 |
| 4,756,543 A * | 7/1988 | Cromnow et al. | 280/432 |
| 5,540,538 A * | 7/1996 | Head, Sr. | 414/485 |
| 5,711,541 A * | 1/1998 | Middlin et al. | 280/455.1 |
| 6,070,681 A * | 6/2000 | Catanzarite et al. | 180/89.15 |
| 6,260,873 B1 * | 7/2001 | Bishel et al. | 280/486 |
| 6,292,094 B1 | 9/2001 | Deng et al. | 340/431 |
| 6,394,239 B1 * | 5/2002 | Carlson | 188/267.2 |
| 6,422,584 B1 * | 7/2002 | Bittroff et al. | 280/432 |
| 6,488,291 B1 * | 12/2002 | Bellis, Jr. | 280/32.7 |
| 6,543,589 B2 * | 4/2003 | Anderson | 188/267.2 |

* cited by examiner

Primary Examiner—Lesley D. Morris
Assistant Examiner—Marc A. Scharich

(57) ABSTRACT

A trailer stability control apparatus for a vehicle and a trailer includes a trailer hitch assembly interconnecting a rear end of the vehicle and a front end of the trailer. The trailer stability control apparatus also includes at least one controllable damper connected to the trailer hitch assembly. The trailer stability control apparatus further includes a controller electrically connected to the at least one controllable damper for providing continuously controllable damping forces between the vehicle and the trailer.

21 Claims, 4 Drawing Sheets

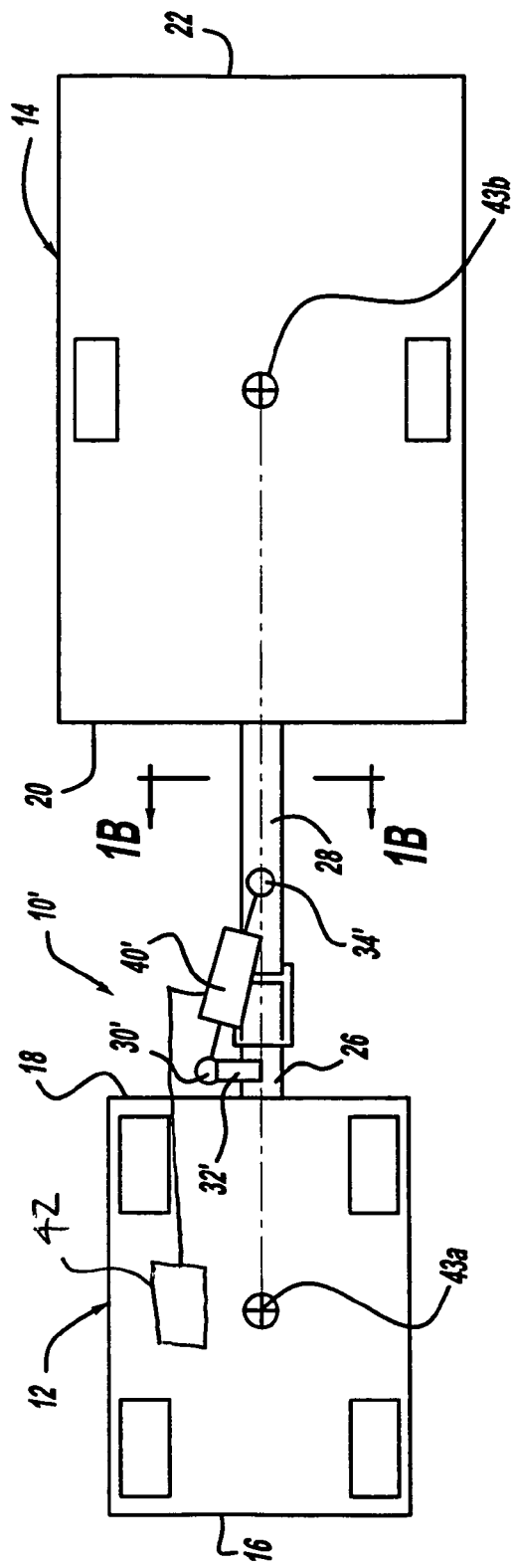
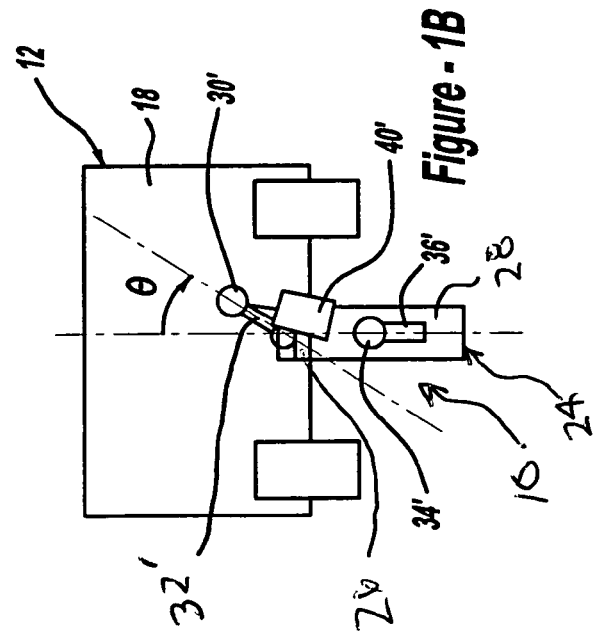
*Figure - 1A*
*Figure - 1B*

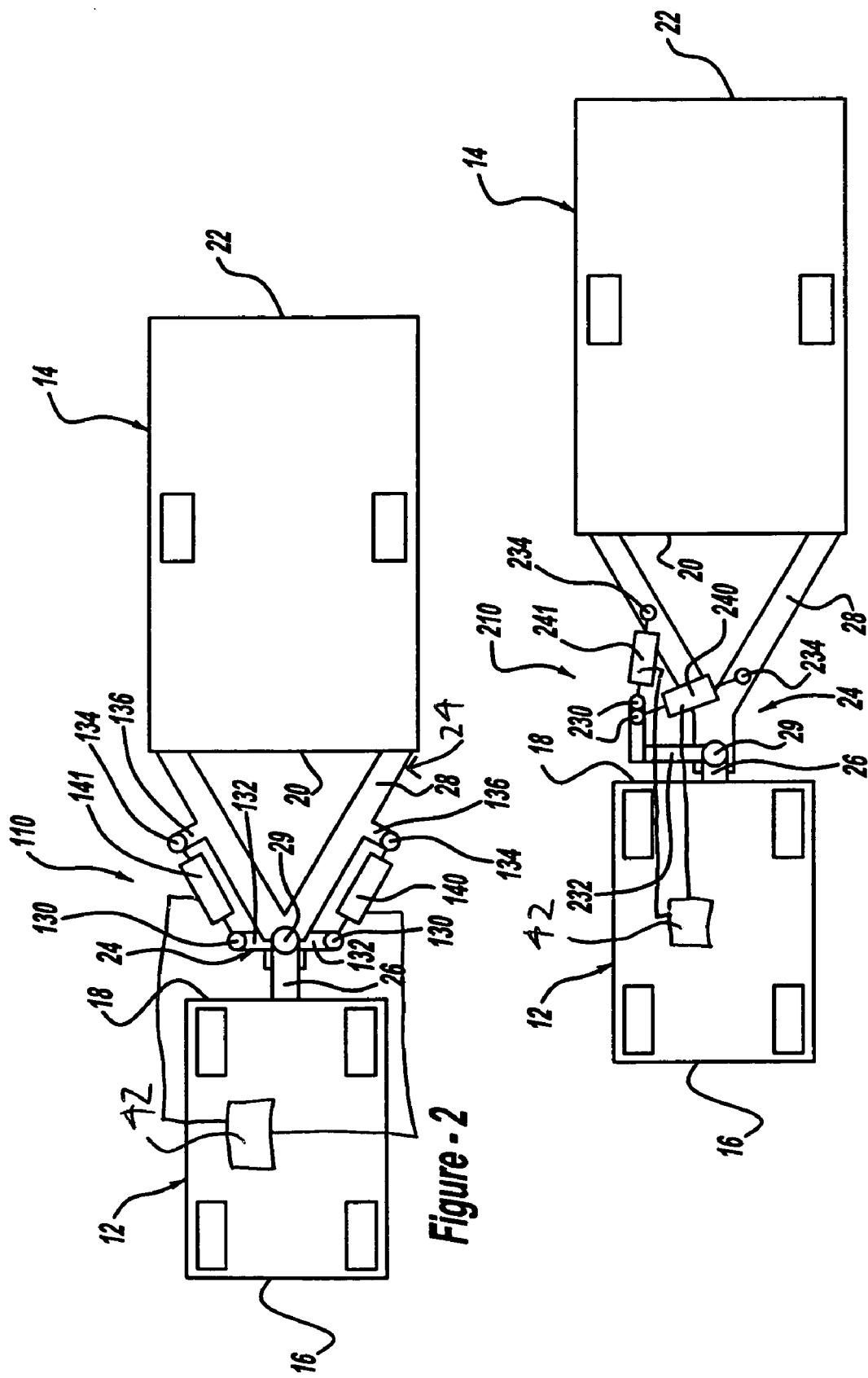

TRAILER STABILITY CONTROL APPARATUS

TECHNICAL FIELD

The present invention relates generally to vehicles and, more particularly, to a trailer stability control apparatus for a vehicle and a trailer.

BACKGROUND OF THE INVENTION

It is known that, oftentimes, trailers are used in conjunction with vehicles such as motor vehicles. Typically, the trailer is attached to a rear of the motor vehicle. An example of such a trailer has a wheeled body having two tow bars at its forward end, which are secured to a hitch at the rear end of the motor vehicle. However, variation in mass of the trailer requires adjustment of yaw, heave, and roll damping to achieve best trailer stability.

It is also known about means to enhance the stability of a trailer and a vehicle. Typically, either a single fixed damper is placed between the vehicle and the trailer hitch or bi-state shock absorbers are placed on the vehicle rear suspension or a rear steering system of the vehicle is used to stabilize the vehicle and the trailer. Passive yaw dampers have fixed damping characteristics. However, the passive dampers for the trailer hitch do not provide optimum damping for both ride and handling under all conditions and can only be a compromise between ride and handling characteristics of the vehicle. The use of a single degree of freedom linked to the vehicle to control multiple elements does not result in good overall control and the best possible stability for the trailer. The use of vehicle rear suspension damping with bi-state control will also result in a compromised ride and handling of the vehicle and does not influence the yaw and roll dynamics of the trailer significantly. In addition, the rear steering system requires very expensive actuators and extremely complex control.

As a result, it is desirable to provide a trailer stability control apparatus that provides fast control of damping forces. It is also desirable to provide a trailer stability control apparatus that provides control of damping forces over a wide operating range. It is further desirable to provide a trailer stability control apparatus that provides control of damping forces at a relatively low cost. Therefore, there is a need in the art to provide a trailer stability control apparatus that meets these desires.

SUMMARY OF THE INVENTION

It is, therefore, one object of the present invention to provide a new trailer stability control apparatus for a vehicle and a trailer.

It is another object of the present invention to provide a trailer stability control apparatus that has a controllable damper.

To achieve the foregoing objects, the present invention is a trailer stability control apparatus for a vehicle and a trailer including a trailer hitch assembly interconnecting a rear end of the vehicle and a front end of the trailer. The trailer stability control apparatus also includes at least one controllable damper connected to the trailer hitch assembly. The trailer stability control apparatus further includes a controller electrically connected to the at least one controllable damper for providing continuously controllable damping forces between the vehicle and the trailer.

One advantage of the present invention is that a trailer stability control apparatus is provided for a vehicle and a trailer. Another advantage of the present invention is that the trailer stability control apparatus provides a relatively simple mechanism to control the stability of a trailer hitch assembly under varying road and driving conditions. Yet another advantage of the present invention is that the trailer stability control apparatus improves the ride and handling of the vehicle with additional control available by using adjustable shock absorbers. Still another advantage of the present invention is that the trailer stability control apparatus incorporates controllable dampers such as magneto-rheological fluid based shock absorbers that provide fast response, wide control range of damping forces, and consistent performance over a wide range of operation conditions. A further advantage of the present invention is that the trailer stability control apparatus enhances stability of the vehicle and the trailer by controlling roll, pitch, and yaw simultaneously. Yet a further advantage of the present invention is that the trailer stability control apparatus preferably uses magneto-rheological dampers that are simple and relatively low cost for independent control of vehicle and trailer movements to enhance ride, handling, and trailering under varying road and driving conditions. Still a further advantage of the present invention is that the trailer stability control apparatus minimizes yaw and enables towing of trailers under varying load conditions. Another advantage of the present invention is that the trailer stability control apparatus provides a mechanism to enhance towing vehicles that do not have semi-active suspensions.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1A is a diagrammatic plan view of another embodiment, according to the present invention, of the trailer stability apparatus of FIG. 1.

FIG. 1B is a sectional view taken along line 1B-1B of FIG. 1A.

FIG. 2 is a diagrammatic plan view of yet another embodiment, according to the present invention, of the trailer stability apparatus of FIG. 1.

FIG. 3 is a diagrammatic plan view of still another embodiment, according to the present invention, of the trailer stability apparatus of FIG. 1.

DESCRIPTION OF THE PREFERRED EMBODIMENT

Figure 1:
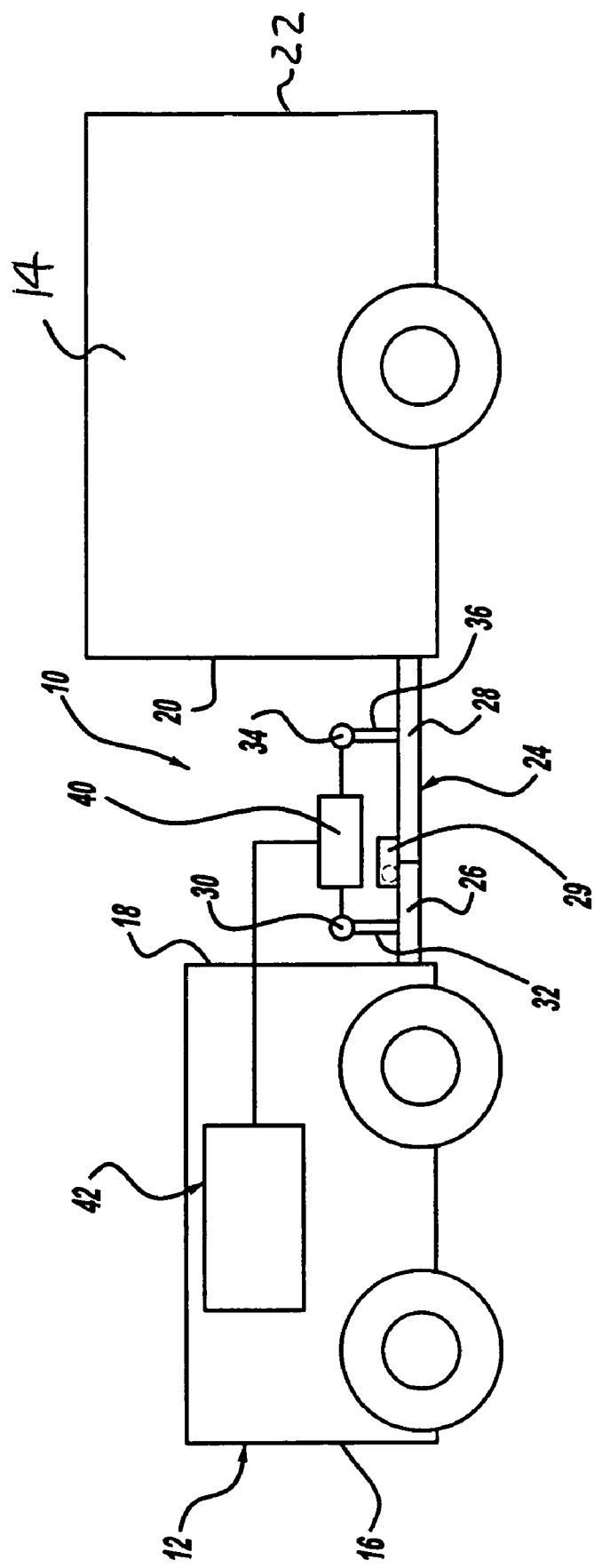
FIG. 1 is a diagrammatic side view of a trailer stability apparatus, according to the present invention, illustrated in operational relationship with a vehicle and trailer.

Referring to the drawings and in particular FIG. 1, one embodiment of a trailer stability control apparatus 10, according to the present invention, is shown for a vehicle, generally indicated at 12, and a trailer, generally indicated at 14. The vehicle 12 is of a motor vehicle or automotive vehicle type. The vehicle 12 has a front 16 and a rear 18. The trailer 14 is of a wheeled body pull type such as a flat bed, cargo box, camper, or the like. The trailer 14 has a front 20 and a rear 22. A trailer hitch assembly, generally indicated at 24, interconnects the rear 18 of the vehicle 12 and the front 20 of the trailer 14. The trailer hitch assembly 24 allows the trailer 14 to be hitched or connected to the vehicle 12. The trailer hitch assembly 24 includes a first hitch member 26 operatively connected to the vehicle 12 at the rear 18 thereof and a second hitch member 28 operatively connected to the trailer 14 at the front 20 thereof. The first hitch member 26 and second hitch member 28 are removably connected at 29. The first hitch member 26 may be a hitch and the second hitch member 28 may be a tow bar. It should be appreciated that, except for the trailer stability control apparatus 10, the vehicle 12, trailer 14, and trailer hitch assembly 24 are conventional and known in the art.

The trailer stability control apparatus 10 includes a first bearing 30 operatively connected to the first hitch member 26. The first bearing 30 is of a spherical type. The first bearing 30 is elevated above the first hitch member 26 by suitable support structure such as a post 32. The trailer stability control apparatus 10 also includes a second bearing 34 operatively connected to the second hitch member 28. The second bearing 34 is of a spherical type. The second bearing 34 is elevated above the second hitch member 28 by suitable support structure such as a post 36.

The trailer stability control apparatus 10 further includes at least one, preferably a single controllable damper 40 interconnecting the first bearing 30 and the second bearing 34. The controllable damper 40 is either of a linear or rotary type. The controllable damper 40 is of a controllable type, preferably a magneto-rheological fluid type, electrically connected to a source of electrical power such as a controller 42 to be described. It should be appreciated that any suitable controllable damper may be used for the controllable damper 40. It should also be appreciated that the single controllable damper 40 is preferred with the trailer 14 having a lower weight compared to the vehicle 12.

Referring to FIGS. 1A and 1B, another embodiment, according to the present invention, of the trailer stability control apparatus 10 is shown. Like parts of the trailer stability control apparatus 10 have like primed reference numerals. In this embodiment, the trailer stability control apparatus 10' includes a first bearing 30' operatively connected to the first hitch member 26. The first bearing 30' is of a spherical type. The first bearing 30' is located laterally on one side of the first hitch member 26 by suitable support structure such as a post 32'. The trailer stability control apparatus 10' also includes a second bearing 34' operatively connected to the second hitch member 28. The second bearing 34' is of a spherical type. The second bearing 34' is elevated above the second hitch member 28 by suitable support structure such as a post 36'. The trailer stability control apparatus 10' includes at least one, preferably a single controllable damper 40' interconnecting the first bearing 30' and the second bearing 34'. The controllable damper 40' is either of a linear or rotary type. The controllable damper 40' is of a controllable type, preferably a magneto-rheological fluid type, electrically connected to a source of electrical power such as a controller 42 to be described. It should be appreciated that the first bearing 30' for the controllable damper 40' has an orientation that is offset by an angle (θ) relative to a vertical axis through the post 36'. It should further be appreciated that the controllable damper 40' is arranged to dampen heave, pitch and roll motions of the trailer 14 by proper orientation.

Figure 4:
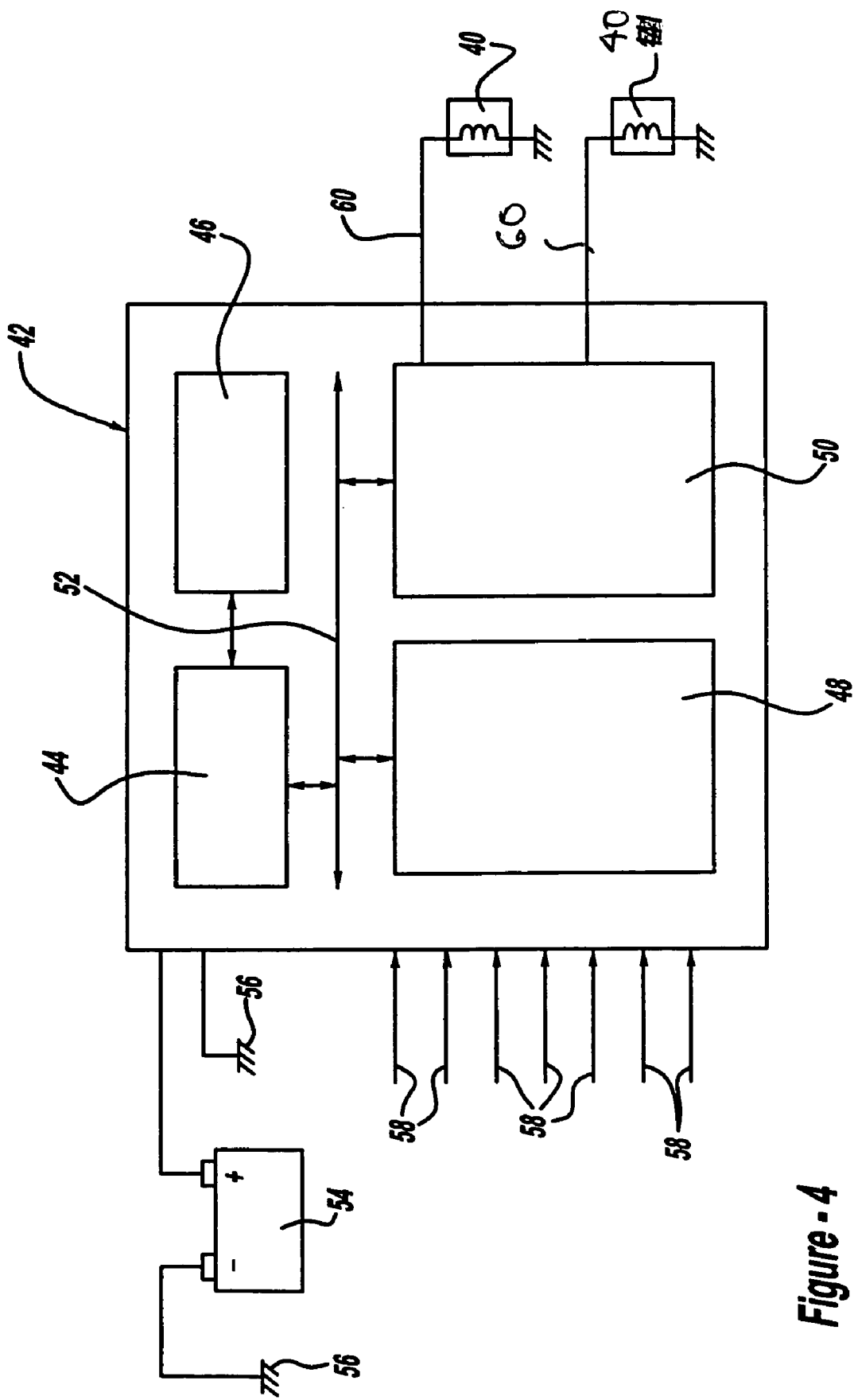
FIG. 4 is a diagrammatic plan view of a controller of the trailer stability apparatus of FIGS. 1 through 3.

Referring to FIGS. 1 and 4, the trailer stability apparatus 10 also includes a controller, generally indicated at 42, electrically connected to the controllable damper 40. The controller 42 includes a central processing unit (CPU) 44, algorithm and memory 46, and a vehicle and sensor interface 48. The controller 42 also includes at least one output current driver 50 for controlling the current through a coil (not shown) of the controllable damper 40. The controller 42 also includes a communication bus 52 interconnecting the CPU 44, memory 46, interface 48, and driver 50. The controller 42 is electrically connected to a source of electrical power 54 such as a vehicle battery and is electrically connected to a ground 56 such as a vehicle frame for return current path. The controller 42 receives information from at least one, preferably a plurality of inputs 58 from other vehicle/trailer sensors (not shown) and vehicle/trailer controllers (not shown) such as vehicle/trailer speed, steering/hitch angle, wheel speed, yaw rate, lateral acceleration, side slip angle, road surface condition or type, and other vehicle/trailer dynamics related data via the communication bus 52 or through individual signal lines. The controller 42 provides at least one output 60 from the output current driver 50 to the controllable damper 40 to control the current through a magnetic coil (not shown) of the controllable damper 40. It should be appreciated that the controller 42 energizes and de-energizes the controllable damper 40 to command the damping force of the controllable damper 40 by adjusting current through the coil. It should also be appreciated that a control algorithm based on the dynamic states of the vehicle 12 and trailer 14 is used to generate the command current.

In operation of the trailer stability control apparatus 10, the controller 42 adjusts the current of the controllable damper 40 based on an algorithm, which is programmed into the memory 46 of the controller 42. The control algorithm for adjusting the damping level of the damper 40 utilizes all or some of the information from the inputs 58. In its simplest form, the damping force is set to a low level at low vehicle speeds and a high level at large steering angles and vehicle speeds. The controllable damper 40 provides continuously controllable damping forces as a function of applied coil current. This enables increased damping during high speed maneuvers and rough road conditions to maintain stability of the vehicle 12 and trailer 14 by reducing the sway, pitch, and roll of the trailer 14. For straight driving and low speed maneuvers, the damping can be reduced for smooth ride and easy turning. It should be appreciated that the pivot points, linkage ratio, damper orientation and turn-up ratio can be chosen to optimize ride and handling by controlling the roll, heave, pitch, and yaw rates under various driving conditions. It should also be appreciated that the trailer stability control apparatus 10 controls the oscillations of the vehicle 12 and trailer 14 using the controllable damper 40.

Referring to FIG. 2, yet another embodiment, according to the present invention, of the trailer stability control apparatus 10 is shown. Like parts of the trailer stability control apparatus 10 have like reference numerals increased by one hundred (100). In this embodiment, the trailer stability control apparatus 110 includes a plurality of, preferably a pair of first bearings 130 operatively connected to the first hitch member 26. The first bearings 130 are located laterally on opposed sides of the first hitch member 26 by suitable support structure such as posts 132. The trailer stability control apparatus 110 also includes a plurality of, preferably a pair of second bearings 134 operatively connected to the second hitch member 28. The second bearings 134 are located laterally on opposed sides of the second hitch member 28 by suitable support structure such as posts 136. The trailer stability control apparatus 110 further includes a plurality of controllable dampers, preferably a first controllable damper 140 interconnecting one first bearing 130 and one second bearing 134 and a second controllable damper 141 interconnecting the other first bearing 130 and the other second bearing 134. The controllable dampers 140 and 141 are of a controllable type such as a magneto-rheological fluid damper electrically connected to a source of electrical power such as the controller 42. The operation of the trailer stability control apparatus 110 is similar to the trailer control stability apparatus 10. It should be appreciated that any suitable controllable damper may be used. It should also be appreciated that multiple controllable dampers such as the controllable dampers 140 and 141 are preferred for the trailer 14 having a weight similar to or larger than that of the vehicle 12. It should further be appreciated that the controllable dampers 140 and 141 are arranged in such a way as to dampen heave, pitch and roll motions of the trailer 14.

Referring to FIG. 3, still another embodiment, according to the present invention, of the trailer stability control apparatus 10 is shown. Like parts of the trailer stability control apparatus 10 have like reference numerals increased by two hundred (200). In this embodiment, the trailer stability control apparatus 210 includes a plurality of, preferably a pair of first bearings 230 operatively connected to the first hitch member 26. The first bearings 230 are located laterally on one side of the first hitch member 26 by suitable support structure such as a generally "L" shaped post 232. The trailer stability control apparatus 210 also includes a plurality of, preferably a pair of second bearings 234 operatively connected to the second hitch member 28. The second bearings 234 are located on opposed sides of the second hitch member 28. The trailer stability control apparatus 210 further includes a plurality of controllable dampers, preferably a first controllable damper 240 interconnecting one first bearing 230 and one second bearing 234 and a second controllable damper 241 interconnecting the other first bearing 230 and the other second bearing 234. The controllable dampers 240 and 241 are of a controllable type such as a magneto-rheological fluid damper electrically connected to a source of electrical power such as the controller 42. The operation of the trailer stability control apparatus 210 is similar to the trailer stability control apparatus 10. It should be appreciated that any suitable controllable damper may be used. It should also be appreciated that multiple controllable dampers such as the controllable dampers 240 and 241 are preferred for the trailer 14 having a weight similar to or larger than that of the vehicle 12. It should further be appreciated that the controllable dampers 240 and 241 are arranged in such a way as to dampen heave, pitch and roll motions of the trailer 14.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A trailer stability control apparatus for a vehicle and a trailer comprising:

a trailer hitch assembly interconnecting a rear end of the vehicle and a front end of the trailer;

at least one controllable damper connected to said trailer hitch assembly;

a controller electrically connected to said at least one controllable damper for providing continuously controllable damping forces between the vehicle and the trailer;

said trailer hitch assembly comprising a first hitch member operatively connected to the vehicle and a second hitch member operatively connected to the trailer; and at least one first bearing of a spherical type operatively supported by said first hitch member and at least one second bearing operatively supported by said second hitch member.

2. The trailer stability control apparatus as set forth in claim 1 wherein said at least one controllable damper is of a linear type.

3. The trailer stability control apparatus as set forth in claim 1 wherein said at least one controllable damper is of a rotary type.

4. The trailer stability control apparatus as set forth in claim 1 wherein said at least one controllable damper comprises a single controllable damper interconnecting said at least one first bearing and said at least one second bearing.

5. The trailer stability control apparatus as set forth in claim 4 wherein said at least one first bearing is offset by an angle relative to a vertical axis through said at least one second bearing.

6. The trailer stability control apparatus as set forth in claim 1 wherein said at least one first bearing comprises a pair of first bearings connected to said first hitch member and said at least one second bearing comprises a pair of second bearings connected to said second hitch member.

7. The trailer stability control apparatus as set forth in claim 6 wherein said at least one controllable damper comprises a first controllable damper interconnecting one of said pair of first bearings and one of said pair of second bearings and a second controllable damper interconnecting another of said pair of first bearings and another of said pair of second bearings.

8. A trailer stability control apparatus comprising:

a vehicle having a rear end;

a trailer having a front end;

a trailer hitch assembly interconnecting said rear end of said vehicle and said front end of said trailer;

at least one controllable damper connected to said trailer hitch assembly;

a controller electrically connected to said at least one controllable damper for providing continuously controllable damping forces between said vehicle and said trailer; and at least one first bearing of a spherical type operatively supported by a first hitch member and at least one second bearing operatively supported by a second hitch member.

9. The trailer stability control apparatus as set forth in claim 8 wherein said at least one controllable damper is of a linear type.

10. The trailer stability control apparatus as set forth in claim 8 wherein said at least one controllable damper is of a rotary type.

11. The trailer stability control apparatus as set forth in claim 8 wherein said trailer hitch assembly comprises a first hitch member operatively connected to the vehicle and a second hitch member operatively connected to the trailer.

12. A trailer stability control apparatus comprising:
a vehicle having a rear end;
a trailer having a front end;
a trailer hitch assembly interconnecting said rear end of said vehicle and said front end of said trailer;
at least one controllable damper connected to said trailer hitch assembly;
a controller electrically connected to said at least one controllable damper for providing continuously controllable damping forces between said vehicle and said trailer;
at least one first bearing of a spherical type operatively supported by a first hitch member and at least one second bearing operatively supported by a second hitch member; and
wherein said at least one controllable damper comprises a single controllable damper interconnecting said at least one first bearing and said at least one second bearing.

13. The trailer stability control apparatus as set forth in claim 12 wherein said at least one first bearing is offset by an angle relative to a vertical axis through said at least one second bearing.

14. A trailer stability control apparatus comprising:
a vehicle having a rear end;
a trailer having a front end;
a trailer hitch assembly interconnecting said rear end of said vehicle and said front end of said trailer,
at least one controllable damper connected to said trailer hitch assembly;
a controller electrically connected to said at least one controllable damper for providing continuously controllable damping forces between said vehicle and said trailer;
at least one first bearing of a spherical type operatively supported by a first hitch member and at least one second bearing operatively supported by a second hitch member; and
wherein said at least one first bearing comprises a pair of first bearings connected to said first hitch member and said at least one second bearing comprises a pair of second bearings connected to said second hitch member.

15. The trailer stability control apparatus as set forth in claim 14 wherein said at least one controllable damper comprises a first controllable damper interconnecting one of said pair of first bearings and one of said pair of second bearings and a second controllable damper interconnecting another of said pair of first bearings and another of said pair of second bearings.

16. A trailer stability control apparatus comprising:
a trailer hitch assembly interconnecting a rear end of a vehicle and a front end of a trailer;
at least one controllable damper connected to said trailer hitch assembly;
a controller electrically connected to said at least one controllable damper for providing continuously controllable damping forces between the vehicle and the trailer;
said trailer hitch assembly comprising a first hitch member operatively connected to the vehicle and a second hitch member operatively connected to the trailer;
at least one first bearing operatively supported by said first hitch member; and
a post to elevate said first bearing above said first hitch member and wherein said at least one first bearing is offset by an angle relative to a vertical axis through said post.

17. A trailer stability control apparatus comprising:
a trailer hitch assembly interconnecting a rear end of a vehicle and a front end of a trailer;
at least one controllable damper connected to said trailer hitch assembly;
a controller electrically connected to said at least one controllable damper for providing continuously controllable damping forces between the vehicle and the trailer;
said trailer hitch assembly comprising a first hitch member operatively connected to the vehicle and a second hitch member operatively connected to the trailer;
at least one first bearing operatively supported by said first hitch member and at least one second bearing operatively supported by said second hitch member; and
wherein said at least one first bearing and said at least one second bearing are of a spherical type.

18. A trailer stability control apparatus comprising:
a vehicle having a rear end;
a trailer having a front end;
a trailer hitch assembly interconnecting said rear end of said vehicle and said front end of said trailer;
at least one controllable damper connected to said trailer hitch assembly;
a controller electrically connected to said at least one controllable damper for providing continuously controllable damping forces between said vehicle and said trailer;
at least one first bearing operatively supported by said first hitch member; and
a post to elevate said first bearing above said first hitch member and wherein said at least one first bearing is offset by an angle relative to a vertical axis through said post.

19. A trailer stability control apparatus comprising:
a vehicle having a rear end;
a trailer having a front end;
a trailer hitch assembly interconnecting said rear end of said vehicle and said front end of said trailer;
at least one controllable damper connected to said trailer hitch assembly;
a controller electrically connected to said at least one controllable damper for providing continuously controllable damping forces between said vehicle and said trailer;

at least one first bearing operatively supported by a first hitch member and at least one second bearing operatively supported by a second hitch member; and wherein said at least one first bearing and said at least one second bearing are of a spherical type.

20. A stability control apparatus comprising:

a vehicle having a rear end;

a trailer having a front end;

a first hitch member connected to said rear end of said vehicle and a second hitch member connected to said front end of said trailer;

at least one first bearing of a spherical type operatively supported by said first hitch member and at least one second bearing operatively supported by said second hitch member;

a single controllable damper interconnecting said at least one first bearing and said at least one second bearing; and a controller electrically connected to said controllable damper for providing continuously controllable damping forces between said vehicle and said trailer.

21. A trailer stability control apparatus comprising:

a vehicle having a rear end;

a trailer having a front end;

a first hitch member connected to said rear end of said vehicle and a second hitch member connected to said front end of said trailer;

at least one first bearing operatively supported by said first hitch member and at least one second bearing operatively supported by said second hitch member;

a single controllable damper interconnecting said at least one first bearing and said at least one second bearing;

a controller electrically connected to said controllable damper for providing continuously controllable damping forces between said vehicle and said trailer; and a post to elevate said first bearing above said first hitch member and wherein said at least one first bearing is offset by an angle relative to a vertical axis through said post.

* * * * *